United States Patent
Evers et al.

(10) Patent No.: US 10,107,301 B2
(45) Date of Patent: Oct. 23, 2018

(54) ROTOR HUB ASSEMBLY, ELECTRIC FAN

(71) Applicant: Brose Fahrzeugteile GmbH & Co. KG, Wuerzburg, Wuerzburg (DE)

(72) Inventors: Andre Evers, Oldenburg (DE); Franziska Rohm, Wuerzburg (DE); Alexander Gass, Berlin (DE); Sascha Dresbach, Wuerzburg (DE); Tilman Schafer, Edewecht (DE)

(73) Assignee: BROSE FAHRZEUGTEILE GMBH & CO. KOMMANDITGESELLSCHAFT, WURZBURG, Wuerzburg (DE)

( * ) Notice: Subject to any disclaimer, the term of this patent is extended or adjusted under 35 U.S.C. 154(b) by 333 days.

(21) Appl. No.: 14/910,730

(22) PCT Filed: Aug. 7, 2014

(86) PCT No.: PCT/EP2014/066967
§ 371 (c)(1),
(2) Date: Feb. 8, 2016

(87) PCT Pub. No.: WO2015/018882
PCT Pub. Date: Feb. 12, 2015

(65) Prior Publication Data
US 2016/0186771 A1    Jun. 30, 2016

(30) Foreign Application Priority Data

Aug. 9, 2013    (DE) .................. 10 2013 215 808

(51) Int. Cl.
*F04D 29/28*    (2006.01)
*H02K 9/06*    (2006.01)
(Continued)

(52) U.S. Cl.
CPC .......... *F04D 29/288* (2013.01); *F04D 17/16* (2013.01); *F04D 25/06* (2013.01); *F04D 29/281* (2013.01);
(Continued)

(58) Field of Classification Search
CPC ..... F04D 29/329; F04D 29/5806; H02K 7/14; H02K 9/06
See application file for complete search history.

(56) References Cited

U.S. PATENT DOCUMENTS

| 4,883,982 A | 11/1989 | Forbes et al. | |
|---|---|---|---|
| 5,944,497 A | * 8/1999 | Kershaw | ............... F04D 25/082 417/368 |

(Continued)

FOREIGN PATENT DOCUMENTS

| DE | 3917040 A1 | 12/1989 |
|---|---|---|
| DE | 103 05 649 A1 | 8/2004 |

(Continued)

OTHER PUBLICATIONS

International Search Report and Written Opinion for International Application No. PCT/EP2014/066967, dated Sep. 8, 2015, 7 pages.

(Continued)

Primary Examiner — Ninh H Nguyen
(74) Attorney, Agent, or Firm — Westman, Champlin & Koehler, P.A.

(57) ABSTRACT

The invention relates to a rotor hub assembly for an electric fan, in particular for a radiator fan of a motor vehicle, comprising a hub cup, which rotates during operation and which has air outlet guides on the inside of the hub cup, which air outlet guides are arranged and shaped in such a way that the air outlet guides guide and accelerate cooling air, wherein a magnetic return cup is arranged inside the hub cup, which return cup has air passage openings, which, (Continued)

together with the air outlet guides, form continuous air outlets for a cooling air flow from the pressure side to the vacuum side of the fan. The invention further relates to an electric fan having such a rotor assembly.

14 Claims, 8 Drawing Sheets

(51) Int. Cl.
    *H02K 7/14*         (2006.01)
    *F04D 29/32*      (2006.01)
    *F04D 29/58*      (2006.01)
    *F04D 17/16*      (2006.01)
    *F04D 25/06*      (2006.01)

(52) U.S. Cl.
    CPC ......... *F04D 29/329* (2013.01); *F04D 29/584* (2013.01); *F04D 29/5806* (2013.01); *H02K 7/14* (2013.01); *H02K 9/06* (2013.01)

(56) References Cited

U.S. PATENT DOCUMENTS

| | | | |
|---|---|---|---|
| 7,078,834 B2 * | 7/2006 | Liu | ............ F04D 25/082 310/52 |
| 7,166,940 B2 | 1/2007 | Ewert et al. | |
| 7,244,110 B2 * | 7/2007 | Hong | ............ F04D 25/082 310/62 |
| 7,585,159 B2 * | 9/2009 | Caplan | ............ F01D 5/34 416/169 A |
| 7,598,634 B2 * | 10/2009 | Izumi | ............ F04D 25/0613 310/58 |
| 8,251,676 B2 | 8/2012 | Fleischmann et al. | |
| 2006/0119195 A1 | 6/2006 | Liu | |
| 2013/0216376 A1 | 8/2013 | Niegorski et al. | |

FOREIGN PATENT DOCUMENTS

| | | |
|---|---|---|
| DE | 11 2012 003 536 T5 | 6/2014 |
| EP | 1 050 682 A2 | 11/2000 |
| EP | 2 083 506 A1 | 7/2009 |
| FR | 2 815 676 A1 | 4/2002 |
| GB | 2 422 495 A | 7/2006 |
| WO | 2008/146154 A2 | 12/2008 |

OTHER PUBLICATIONS

German Search Report for German Patent Application No. 10 2013 215 808.4, dated Jul. 2, 2014, 6 pages.

* cited by examiner

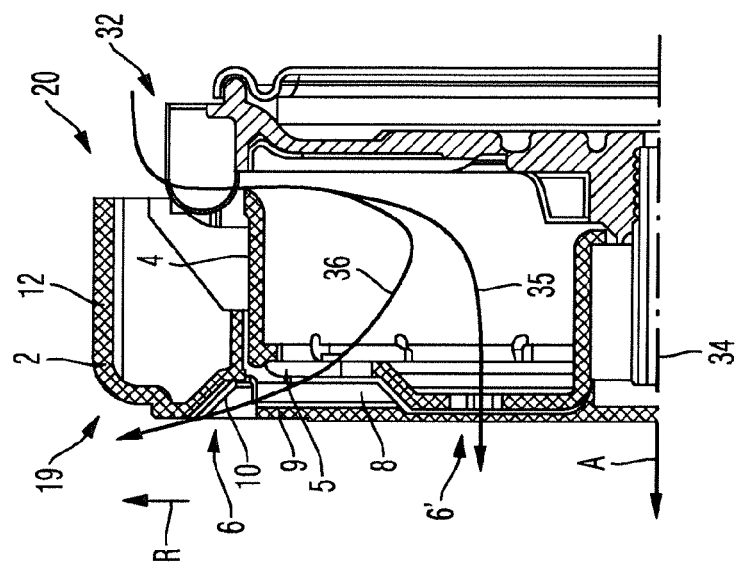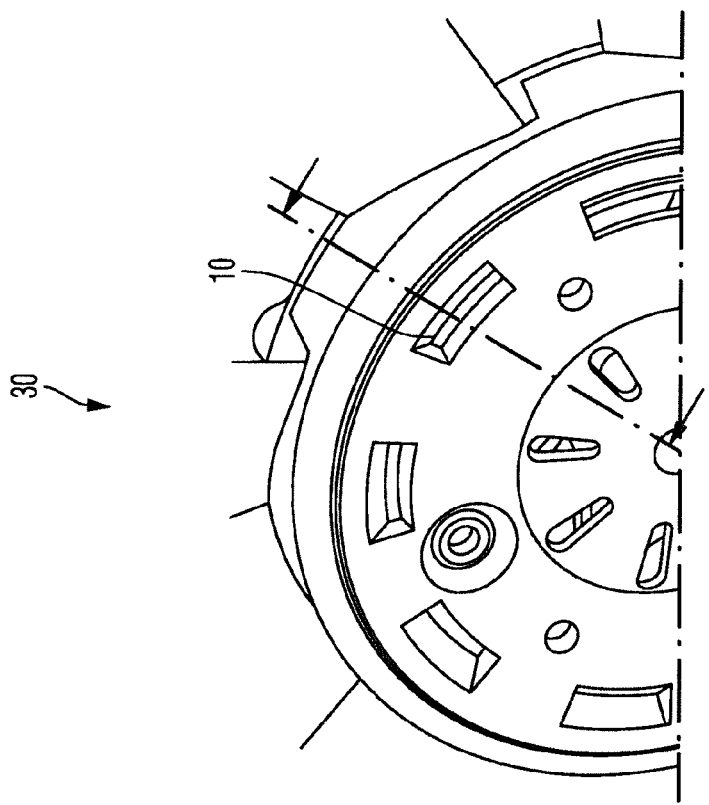
Fig. 3A
Fig. 3B

ROTOR HUB ASSEMBLY, ELECTRIC FAN

CROSS-REFERENCE TO RELATED APPLICATION

This Application is a Section 371 National Stage Application of International Application No. PCT/EP2014/066967, filed 7 Aug. 2014 and published as WO 2015/018882 A2 on 12 Feb. 2015, in German, the contents of which are hereby incorporated by reference in their entirety.

FIELD OF THE INVENTION

The present invention relates to a rotor hub assembly for an electric fan and to an electric fan.

TECHNICAL BACKGROUND

Ventilated rotor hubs are used in electric fans to cool the components of the electric motor during operation. In particular, in fans for motor vehicle radiators, cooling of the electric motor is indispensable. They have to have a high operational reliability at highly varied temperatures, since at an increased temperature of the conductors, the resistance thereof and thus the power loss, which is in turn converted into heat, also increase, and this can lead to the destruction of the electric components and parts of the electric motor (in other words the control electronics, the power switch and the windings) and thus to the electric motor failing.

European patent EP 1 623 122 B1 discloses such a ventilated rotor hub of a motor vehicle fan. In this case, a hub of the fan wheel comprises ribs on the inside thereof which act as centrifugal fan blades. An airflow through the electric motor is thus provided and is drawn in from the pressure side of the fan, reversed inside the hub by the shape of the ribs, and blown out back to the pressure side. The hub further comprises, on the flat side thereof orientated towards the underpressure side, slits which are provided in the region of the ribs in a particular radius portion in such a way that an outer part of the hub is connected to an inner part of the hub exclusively via the ribs. This construction serves to influence the torsional oscillation behaviour of the rotor hub. An influence on the airflow by means of the slits is not disclosed.

SUMMARY OF THE INVENTION

Against this background, the object of the present invention is to specify an improved rotor arrangement.

According to the invention, this object is achieved by a rotor arrangement having the features of claim 1 and/or by a cooling fan have the features of claim 14.

Accordingly, the following are provided:
a rotor hub arrangement for an electric fan, in particular for a cooling fan of a motor vehicle, comprising a hub cup which rotates during operation and comprises air escape guides on the inside thereof which are arranged and shaped in such a way that they guide and accelerate cool air, characterised in that a feedback cup is arranged inside the hub cup and comprises air passage openings which, together with the air escape guides, form air outlets for a cool airflow from the pressure side to the underpressure side of the fan.
an electric fan, in particular a cooling fan of a motor vehicle, comprising an electric motor, having a pressure side and an underpressure side, the fan comprising a rotor hub arrangement according to the invention and being formed and configured so as to convey air from the underpressure side to the pressure side.

The concept of the present invention is to provide a cool airflow which is conveyed on the one hand by the pressure gradient from the pressure side to the underpressure side and on the other hand by the rotating air escape guides. For this purpose, on the underpressure side of the fan, air passage openings are provided in the feedback cup and air escape guides are provided in the hub cup, which jointly guide the cool airflow from the pressure side to the underpressure side. Further, at least the air escape guides on the rotating hub cup are shaped in such a way that they additionally convey the cool airflow.

Advantageously, cool air flows through the electric motor as a result, and in particular the cool airflow flows through, and over portions of, the feedback cup which, when installed as a rotor element, holds the magnets of the electric motor. In this way, the electric parts present in the feedback cup, such as the control electronics, the power switch, the windings of the motor and the motor itself, are in effect cooled by the cool airflow.

Further, the cool air mass flow is increased by exploiting two effects, the pressure gradient and the blade effect of the air escape guides, to accelerate the cool airflow. Overall, this thus results in an increased convective heat transfer, in particular including from the feedback cup to the cool air, and this results in an increased cooling performance.

Advantageous embodiments and developments may be derived from the further dependent claims and from the description with reference to the figures in the drawings.

In a preferred embodiment, the air passage openings and air escape guides are formed in such a way that at least some of the cool air is released in the radial direction. In particular, there is an offset of the air passage openings and air escape guides in this case. Preferably, the air escape guides have a contour in this case which is configured and provided for radially accelerating the cool air. Thus, in addition to the axial acceleration brought about by the pressure gradient between the pressure side and the underpressure side, radial acceleration of the cool air is achieved. The airflow thus acquires at least a radial direction component. This is advantageous because the cool air also flows through or flows over edge regions of the electric motor, in particular of the feedback cup. Thus, the surface area over which the cool air effectively flows and the cooling performance as a whole are increased by convective heat transfer.

In an advantageous embodiment, the air escape guides are formed in the manner of an impeller. In this case, the shape corresponds to an impeller which is formed to accelerate radially a fluid incoming in the centre thereof. The air escape guides therefore have a shape that is optimised in terms of flow mechanics.

In a further advantageous embodiment, the air escape guides comprise ribs extending between the base of the hub cup and the feedback cup. Preferably, these ribs are formed integrally with the hub cup. Thus, the gap between the hub cup and the feedback cup is advantageously used for guiding and accelerating the cool airflow in the radial direction. The feedback cup and the hub cup preferably together form an impeller in this case.

In preferred embodiments, the ribs extend in the radial direction and optionally or additionally extend in an arc shape in the radial and circumferential direction. Thus, an impeller-like construction which is optimised in terms of flow is advantageously provided and can be configured in accordance with the desired air mass flow of the cool air.

In advantageous embodiments, the feedback cup is made of a metal material, in particular steel. This is preferably a deep-drawn part. Optionally or in addition, the hub cup is made of a non-metal material, in particular of plastics material. This is preferably an injection-moulded part. By way of these configurations, optimised material allocation is provided overall. In the case of the feedback cup, a mechanically high-strength and additionally thermally conductive material is provided. This material is in particular formed to be optimised electromagnetically and in terms of strength, and is thus advantageous for forming a feedback cup. As regards the hub cup, a material is used which can already be configured very freely in the primary shaping process. Thus, during the manufacturing process of the hub cup, in particular during injection moulding, the ribs can already be shaped at the same time without difficulty. Overall, the strengths of the material in question are thus exploited and used in accordance with the requirements.

In a preferred embodiment, the feedback cup is coupled for conjoint rotation to the hub cup in a predetermined position relative to the hub cup. Thus, the air outlets can be provided in both an advantageous and simple manner so as to be continuous by arranging the air passage openings and the air escape guides such that they overlap one another. For example, for this purpose attachments points may be provided for coupling for conjoint rotation, which are arranged in such a way that a corresponding overlap is established when the hub cup is attached to the feedback cup.

In one embodiment, the feedback cup comprises a base which has a circumferential shoulder orientated towards the hub cup, the air passage openings being arranged in the region of the shoulder and optionally or additionally extending radially outwards from the shoulder. As a result of the shoulder in the base of the feedback cup, a gap, in which the ribs extend, is created between the hub cup and the feedback cup in an advantageous, simple manner. Further, because the air passage openings are arranged in the region of the shoulder and/or extending radially outwards from the shoulder, the feedback cup is advantageously included in the formation of the air outlets. The base corresponds to a base of the cup shape of the feedback cup, and is formed as a face extending in a radial plane.

In preferred embodiments, the air escape guides each form a substantially radially orientated air outlet. Substantially radial should be understood to mean that an additional axial inclination and/or an additional inclination in the circumferential direction of the air outlet may also be provided, but does not obstruct the airflow in the radial direction. As a result of the omission of a deflection of the escaping cool air, the flow resistance of the air outlet is reduced. This increases the effectiveness and efficiency of the cooling.

In one embodiment, the air outlet is formed so as to be embedded in a depression in a base of the hub cup. Optionally or in addition, in this case the air outlet is formed in a clearance in the circumferential wall of the hub cup in this case. The cool airflow is thus guided outwards in the radial direction, without having to be diverted in the axial direction. It can thus flow out in the radial direction. Particularly advantageously, the cool airflow can thus also be admitted back into the primary airflow of the fan, which extends perpendicularly thereto in the axial direction from the underpressure side to the pressure side, in a simple manner. Advantageously, this does not disrupt the primary airflow of the fan. Further, the outflow resistance as the cool air escapes is reduced.

In advantageous embodiments, the air outlet comprises a recess which continues the blade face of the air escape guides towards the outside. The blade face of the air escape guides or in particular of the ribs is thus advantageously enlarged, making it possible to convey a higher air mass flow. Optionally or in addition, the air outlet is formed having an axial elevation, orientated circumferentially in the direction of rotation with respect to the air outlet, and an axial depression orientated circumferentially counter to the direction of rotation with respect to the air outlet. Thus, the cool air flowing out in the radial direction is shielded, counter to the air flowing along on the underpressure side in front of the rotating hub cup, by the elevation, and in terms of flow mechanics this advantageously protects the escaping cool airflow from disruptions. Further, the depression provides the cool air flowing out with an increased outlet cross section, and this is also advantageous in terms of flow mechanics and in particular additionally reduces the outflow resistance.

In one embodiment, the feedback cup comprises a plurality of different types and sizes of cavities. Preferably, slots which enlarge radially at a constant opening angle are provided in this case. These are preferably located in the centre of the feedback cup close to the axis of rotation. Furthermore, optionally or in addition, clearances for forming spokes are provided, the clearances preferably simultaneously forming the air passage openings. Thus, the weight of the feedback cup is reduced and in addition better air through-flow is achieved. Further, as a result of the cavities, the rigidity of the rotor to which the feedback cup belongs can be influenced in a targeted manner, making it possible to improve the acoustics of the fan. Preferably, for this purpose a maximum number of cavities is provided, which are in particular distributed evenly over the circumference and arranged at points which are non-critical electromagnetically and in terms of strength.

In a further embodiment, cavities are formed in the base of the feedback cup as axial air passage openings. Further, cavities are provided in the centre of the base of the hub cup and are formed as axial air escape guides. Together, the axial air passage openings and the axial air escape guides form continuous axial air outlets for releasing cool air in the axial direction. Thus, in addition to the radial release of cool air, another axial cool air outlet is also provided. The cool air can thus be released in the axial and radial direction at the same time, and this advantageously increases the air mass flow of the cool air.

In a preferred embodiment of an electric fan, an inlet opening is provided on the pressure side. This is preferably formed as a circumferential inlet slit or annular slit and provided as an inlet for the cool airflow from the pressure side to the underpressure side. Thus, the inlet opening is located on the side of the fan opposite the outlets. Preferably, the inlet opening or the air slit is located behind the hub cup and the feedback cup or between the rear face thereof and a base holder of the electric motor. The base holder, which preferably carries the electronics and the power switch, is preferably made of aluminium and thus formed as an aluminium cover. Preferably, the base holder is an injection-moulded element which comprises, on the outside thereof, a plurality of fins protruding from the base holder. This measure increases the surface area of the base holder acting as a cooling body, such that the cooling performance for cooling the electronics and the power switch can additionally be increased.

The above embodiments and developments can be combined with one another in any reasonable manner. Further possible embodiments, developments and implementations of the invention also comprise combinations, which are not explicitly mentioned, of features of the invention which are described either above or in the following in relation to the embodiments. In particular, a person skilled in the art will also add individual aspects to each basic form of the present invention as improvements or additions.

CONTENTS OF THE DRAWINGS

In the following, the present invention is described in greater detail with reference to the embodiments set out in the schematic figures of the drawings, in which:

FIG. 3a is a partial perspective view of the fan according to FIG. 2 when assembled;

FIG. 3b is a sectional view of the fan of FIG. 3a along the section plane illustrated therein;

Figure 1:
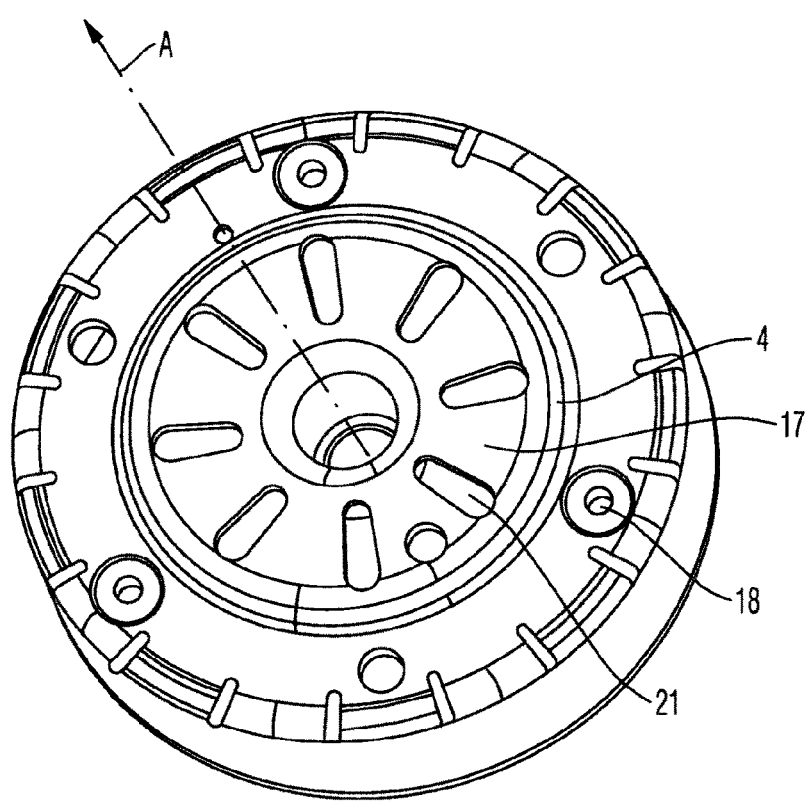
FIG. 1 shows a feedback cup known to the applicant.

The accompanying figures of the drawings are intended to provide further understanding of the embodiments of the invention. They illustrate embodiments and serve, in combination with the description, to explain principles and concepts of the invention. Other embodiments and many of the stated advantages can be seen by referring to the drawings. The elements of the drawings are not necessarily shown to scale with respect to one another.

In the figures of the drawings, identical, functionally equivalent and equivalently operating elements, features and components are provided with the same reference signs in each case, unless stated otherwise.

DESCRIPTION OF EMBODIMENTS

FIG. 1 shows a feedback cup 4, known internally to the applicant, of a cooling fan 30, by means of which a cool airflow is produced in the electric motor by exploiting the pressure gradient between the pressure side and the underpressure side of the fan. The underpressure side is generally also referred to as the suction side, since the air is drawn in to a certain extent as a result of the pressure gradient. For this purpose, a predetermined short-circuit airflow through the electric motor is made possible. Openings 21 are provided in a central region of the base 17 of the feedback cup. These are formed in the centre, in other words close to the axis of rotation, as eight slot openings for the short-circuit airflows. Aside from three attachment points 18 comprising threaded holes and the slot openings 21, the base 17 has a substantially closed surface. In an associated hub cup (not shown), corresponding openings would be provided in the centre for releasing the short-circuit airflow.

Figure 2:
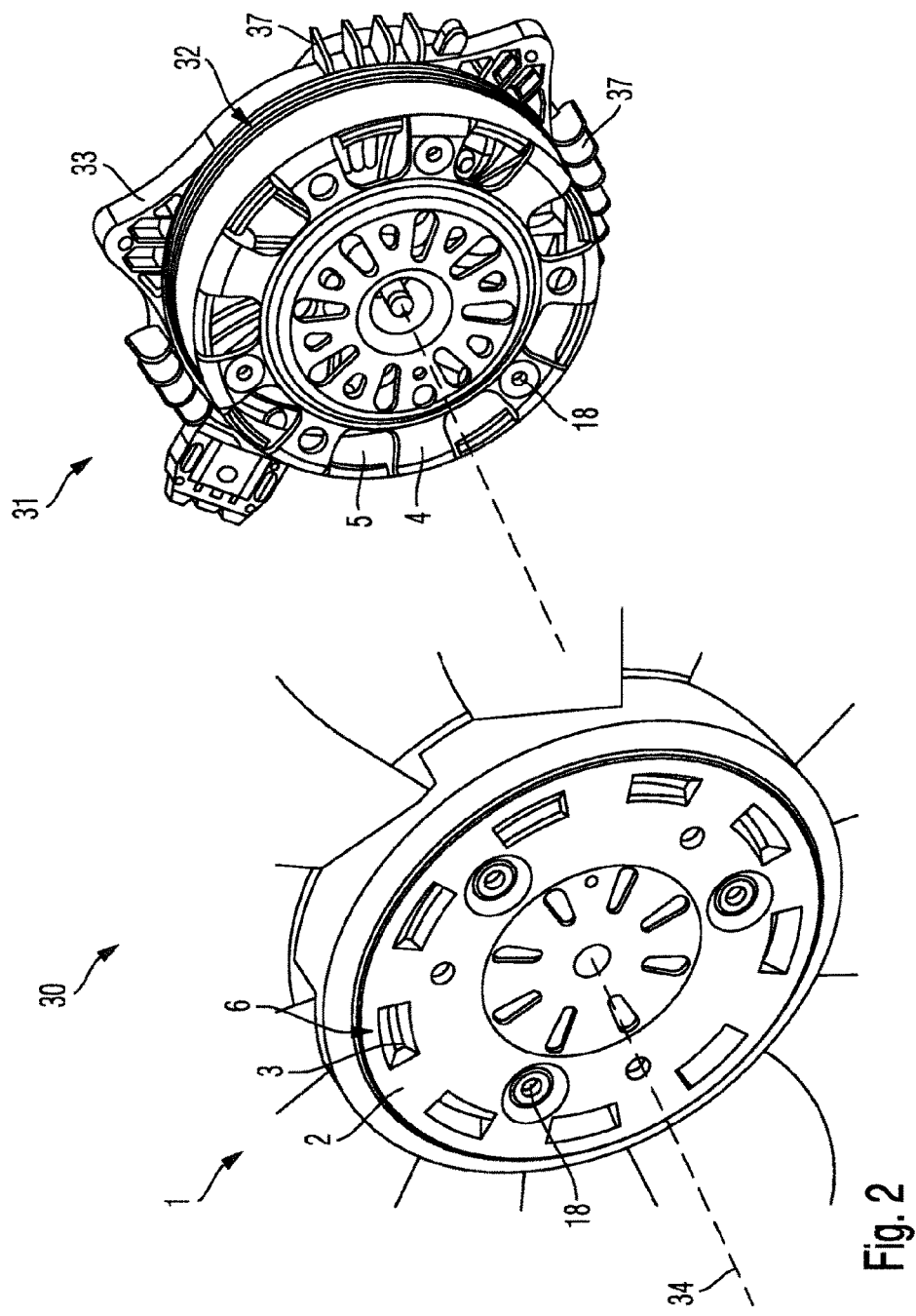
FIG. 2 is a perspective view of a rotor hub arrangement or an electric fan according to the invention, in which the hub cup is not yet assembled.

FIG. 2 shows an electric fan 30 or a rotor hub arrangement 1 according to the present invention. The electric fan 30 comprises an electric motor 31, which, among other things, contains a feedback cup 4. Air passage openings 5 are provided in the feedback cup 4. Electric motors of the construction shown comprise a feedback cup 4 of this type as rotors or armatures rotating about the axis of rotation 34, to which feedback cup in particular permanent magnets (not shown) are fixed. Electromagnets are provided on the stator in a manner known per se. This is preferably an external rotor motor.

The electric motor 31 further comprises a base holder 33, for example made of aluminium or an alloy containing aluminium, which is provided for structurally attaching the fan 30 to a fan case of a motor vehicle. The base holder 33, which preferably carries the electronics and the power switch, is preferably formed as an injection-moulded aluminium cover. The base holder 33 comprises, on the outside thereof, a plurality of rib-like fins 37 protruding from the base holder 33. These fins 37 serve to increase the surface of the base holder 33, which acts as a cooling body, so as to increase the cooling performance.

Between the base holder 33 and the feedback cup 4, an inlet slit 32 for admitting cool air is provided. Using three attachment points 18 provided on each of the feedback cup and the hub cup, the hub cup 2 is axially attached to the feedback cup. For example, in this case three fixing points are provided, at each of which a fixing means (not shown) can be attached.

The hub cup 2 comprises air escape guides 3, which, when assembled, form air outlets 6 together with the air passage openings 5. To cool the electric motor 31, cool air flows through the inlet slit 32 into the electric motor and flows through the feedback cup 4 or the electronics, power switch, windings and electric motor provided therein, the cool air re-escaping from the electric motor 31 or the rotor hub arrangement 1 through the air outlets 6. This is shown in greater detail in FIG. 3b.

FIG. 3a is a partial view of a perspective front view of a fan 30 according to FIG. 2 when assembled. The upper half of the hub of the fan 30 is shown here. Thick arrows and a thick chain line illustrate the section plane of the cross section of FIG. 3b in this case.

FIG. 3b is the cross section of the fan 30 according to FIG. 3a in the section plane shown therein. The fan 30 has an underpressure side 19 and a pressure side 20. The fan 30 is configured and provided to convey air from the underpressure side 19 to the pressure side 20 during operation. This results in a pressure gradient between the pressure side 20 and the underpressure side 19, which according to the present invention is exploited to accelerate a cool airflow in the form of a short-circuit airflow from the pressure side 20 to the underpressure side 19. In the embodiment shown, the airflow through the hub cup 2 and electric motor 31 of the fan 30 is indicated using wavy arrows 35, 36. From the pressure side 20, the cool airflow enters the electric motor 31 and the rotor hub arrangement 1 at the inlet slit 32. A first cool airflow 35 extends (substantially) in the axial direction A and exits the rotor hub arrangement through an axial air outlet 6' located in the centre of said arrangement. A second cool airflow 36 passes through the air passage opening 5 (substantially) in the axial direction A through the feedback cup 4 into a gap between the feedback cup 4 and the hub cup 2. In this gap, which extends between the base 9 of the hub cup 2 and the feedback cup 4, ribs 8 are located which are formed integrally on the base 9 of the hub cup 2. The ribs 8 comprise an impeller contour which conveys the cool air around the axis of rotation 34 in the radial direction R during operation as a result of the rotation of the rotor arrangement 1. The ribs 8 are thus part of the air escape guides 3. The cool air 36 thus flows (substantially) radially in the direction of the air outlet 6, which is formed by a depression 10 in the base 9 of the hub cup 2 and the air passage opening 5 which extends as far as an edge of the feedback cup 4.

In the embodiment shown, the cool air is thus also conveyed in the radial direction R, in addition to the axial through-flow which takes place as a result of the pressure gradient. Further, the radially conveyed cool air is released substantially in the radial direction, in other words in a direction composed of an axial and a radial direction, the radial component preferably being predominant.

Figure 4A:
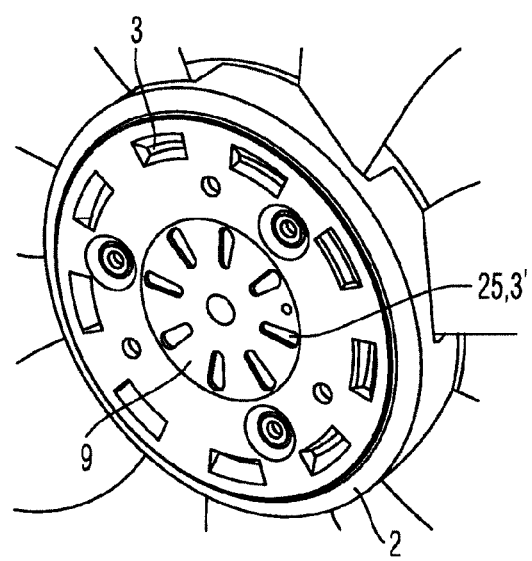
FIG. 4a is a perspective front view of a hub cup in a first embodiment.
Figure 4B:
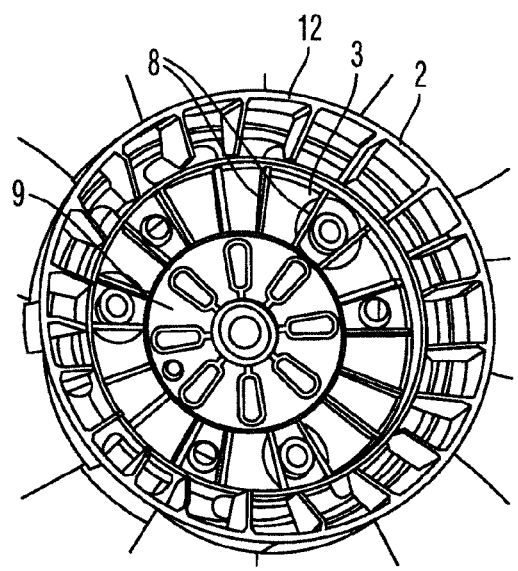
FIG. 4b is a perspective rear view of the hub cup.

FIG. 4a shows a hub cup 2 according to the embodiment shown in FIG. 2. FIG. 4b is a rear perspective view of the hub cup 2 according to FIG. 4a. The hub cup 2 comprises a base 9 and ribs 8 integrally formed thereon. Further, radially orientated air escape guides 3, to which the ribs 8 belong, are formed close to the transition between the circumferential wall 12 and base 9 of the hub cup. In this embodiment, the ribs 8, which in this case too have an impeller contour, accordingly extend radially. Further, in a central region of the base 9 close to the axis of rotation 34, cavities 25 are provided which form axial air escape guides 3'.

Figure 5B:
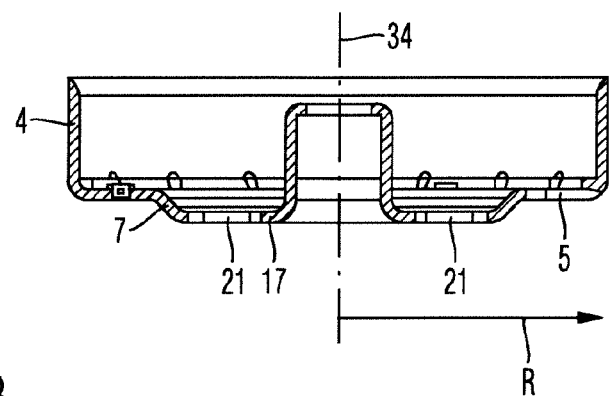
FIG. 5b is a cross section of a feedback cup according to FIG. 5a along the section plane illustrated therein.
Figure 5A:
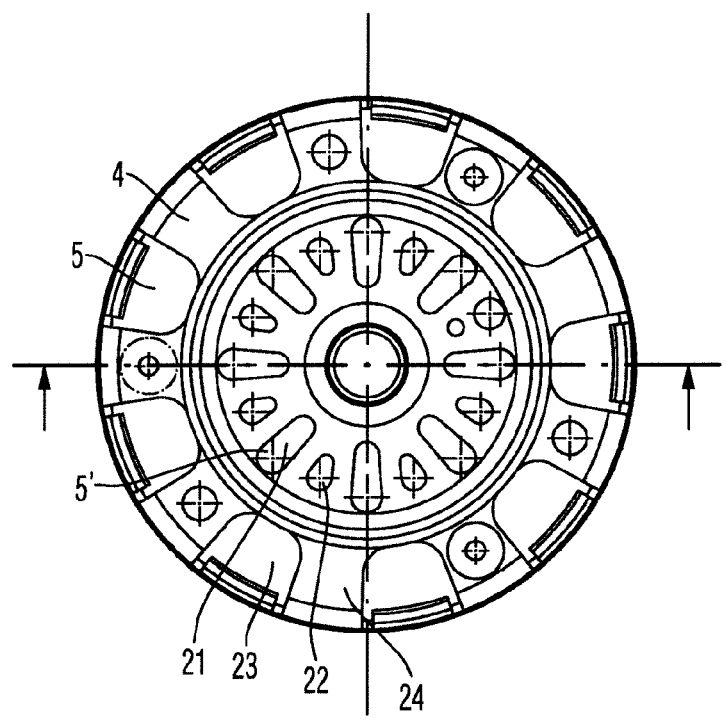
FIG. 5a is a front view of a feedback cup.

FIG. 5a is a front view of a feedback cup 4 according to the embodiment shown in FIG. 2. This comprises, in the centre close to the axis of rotation 34, slots having a constant opening angle and which enlarge in the radial direction. Larger slots 21 and smaller slots 22 are provided in this case. The large slots 21 form axial air passage openings 5'. Further, clearances 23 are provided which form spokes 24 in the outer region of the feedback cup 4. These clearances 23 simultaneously form the radial air passage openings 5.

FIG. 5b is a cross-sectional view of the feedback cup 4 according to FIG. 5a, the section plane extending through the centre of the feedback cup in accordance with the thick chain line in FIG. 5a. This figure shows a base 17 of the feedback cup 4, in which a shoulder 7 is provided. The shoulder 7 separates the central region of the base 17 from an outer region of the base 17, the slots 21, 22 being provided in the central region and the clearances 23 or air passage openings 5 being provided in the outer region. Further, the radial direction R is illustrated, in which the air passage openings 5 make it possible for cool air to escape from the centre of the feedback cup. When the rotor hub arrangement is assembled, the air escape guides 3 of the hub cup 2 are arranged so as to be axially offset together with the air passage openings 5 of the feedback cup 4 and the slots 21 are arranged so as to be axially flush with the cavities 25. Thus, air outlets 6, 6' are provided in the radial and the axial direction in each case.

Figure 6:
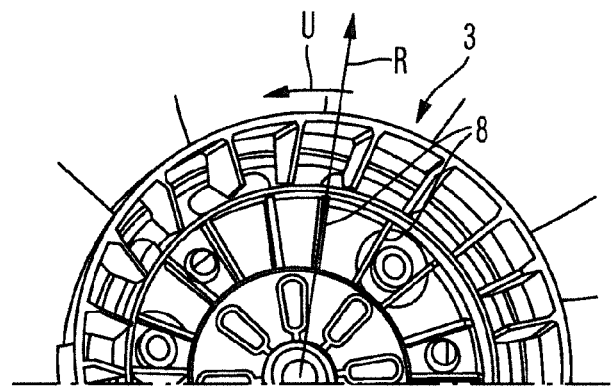
FIG. 6 is a partial view of the rear view according to FIG. 4b of the hub cup of FIGS. 4a and 4b.

FIG. 6 is a partial view of the hub cup of FIG. 4b. The radial direction R and the circumferential direction U are shown, these each relating to the axis of rotation of the hub cup 2. The view shown serves primarily for direct comparison with the embodiment shown alongside in FIG. 7.

Figure 7:
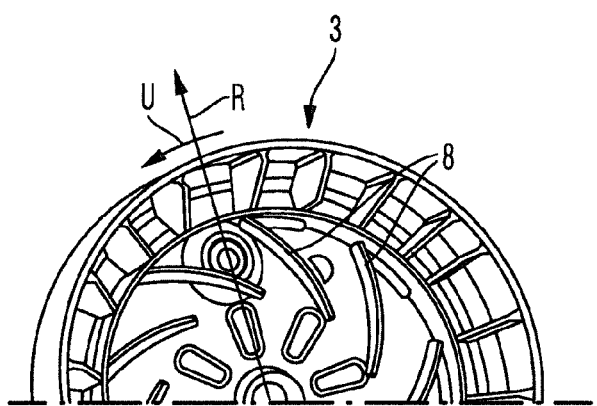
FIG. 7 is a partial view of a perspective rear view of a hub cup according to a second embodiment.

FIG. 7 shows the hub cup 2 according to a second embodiment in a view depicted analogously to FIG. 6 of a perspective partial view of the rear face. By contrast with FIG. 6, in this embodiment the air escape guides 3 have a different shape. They comprise inner ribs 8 which extend in an inner region of the hub cup 2 in the manner of an impeller, both in the radial direction R and in the circumferential direction in the shape of a U-curve. As well as the inner ribs, outer ribs 8' are also provided which are located in an outer, circular-ring shaped region of the hub cup 2 and extend substantially radially outwards. When assembled, together with the feedback cup 4, the ribs 8, 8' of the cup hub 2 form an impeller in the region of these air escape guides 3 which accelerates the cool air in the radial direction R during operation.

Figure 8B:
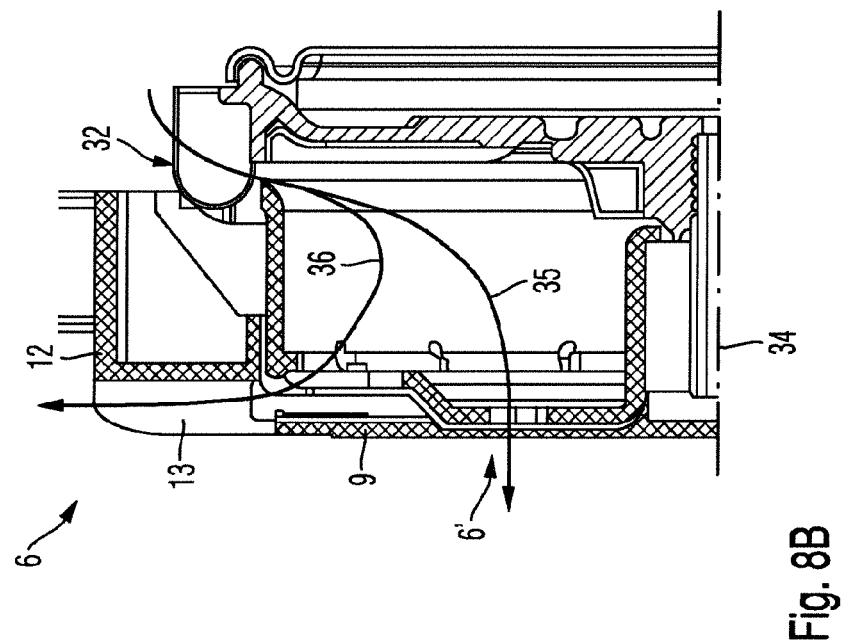
FIG. 8b is a cross section of a fan comprising a hub cup according to FIG. 8a in the section plane illustrated therein.
Figure 8A:
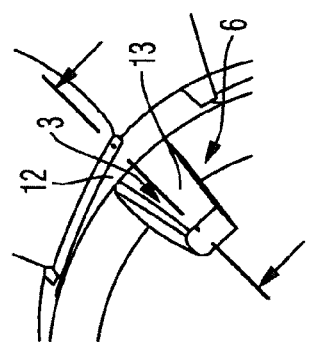
FIG. 8a is a partial view of a perspective front view of a hub cup according to a third embodiment.

FIG. 8a is a perspective partial view of a third embodiment of a hub cup. Merely the region of an air escape guide 3 of an air outlet 6 is shown. In the embodiment shown, the air escape guide 3 comprises a recess 13, which is protracted as far as the circumferential wall 12 of the hub cup 2.

FIG. 8b is a cross section through a fan 30 comprising a hub cup 2 of this type according to FIG. 8a. By contrast with the fan 30 shown in FIG. 3b, in this case the air outlet 6 comprises, in the region of the recess 13, an additional blade face which is formed by the recess 13 and can additionally be used or exploited to accelerate the cool air in the radial direction R. Further, the radial path for the cool airflow is completely clear, since the recess 13 extends as far as the circumferential wall 12 of the hub cup. Thus, as indicated by the thick arrow in the radial direction R, the cool airflow can flow out in the radial direction R, radially along the recess 13 past the edge or past the circumferential wall 12 of the hub cup 2.

Figure 9A:
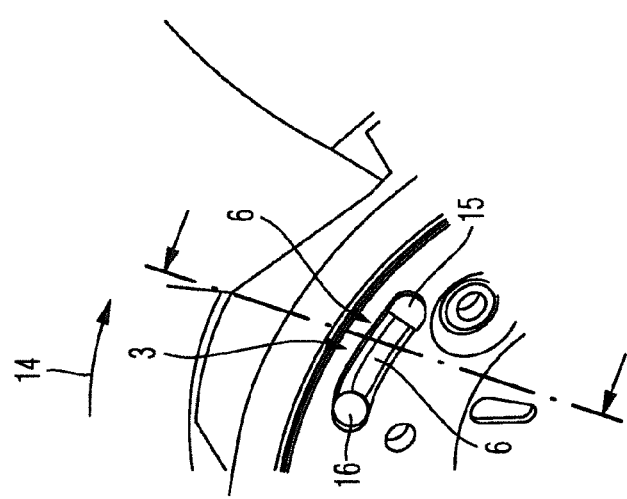
FIG. 9a is a perspective front view of a partial view of a fan having a hub cup according to a fourth embodiment.

FIG. 9a is a partial perspective front view of a fan 30 having a hub cup 2 according to a fourth embodiment. Again, only the region of an air escape guide 3 of an air outlet 6 is shown. The fan 30 comprises, on the circumference thereof in the region of the air outlet 6, an elevation 15 which is orientated in the direction of rotation 14 with respect to the air outlet 6 and extends in the axial direction A. Further, an axial depression 16 is provided in addition to the air outlet 6 and orientated circumferentially counter to the direction of rotation 14 with respect to the air outlet 6.

Figure 9B:
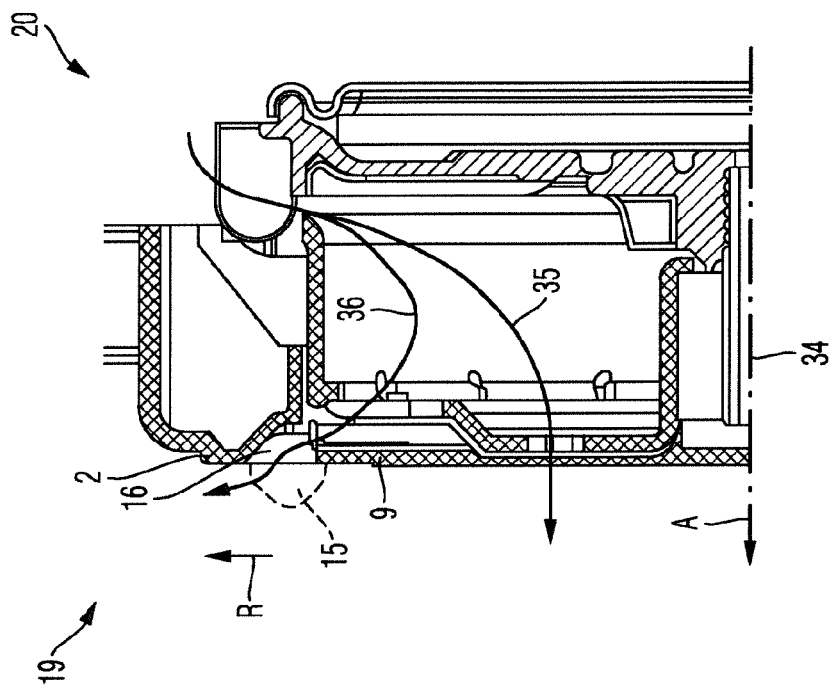
FIG. 9b is a cross section of the fan of FIG. 9a in the section plane illustrated therein.

FIG. 9b is a cross-sectional view of the fan 30 according to FIG. 9a in the section plane illustrated therein using a thick chain line. This cross-sectional view illustrates the depression 16 on the hub cup 2. The depression has a formation in the negative shape of a quarter-ellipsoid, and is formed in the base 9 of the hub cup 2. Further, an elevation 15 is illustrated in dashed lines. The dashed lines merely represent the elevation 15, which is not actually visible in the sectional view shown. Said elevation is shown here nevertheless in dashed lines for better comprehension and simpler illustration. The elevation 15 likewise has the shape of a quarter-ellipsoid, a planar face of the quarter-ellipsoid shielding the edge of the air outlet 6 from airflows or disruptive influences on the negative pressure side 19 during operation. Alternatively, it may also have the shape of a hollow quarter-ellipsoid such that the elevation 15 in effect forms a cap over the face of the air outlet 6.

This makes it possible for the cool airflow to flow out undisrupted. Further, the depression 16 on the circumferential side of the air outlet 6 provides an enlarged outflow cross section in the circumferential direction U, and this is favourable in terms of flow and can reduce the outflow resistance at the air outlet 6.

Although the present invention has hitherto been described entirely by way of preferred embodiments, it is not limited thereto, but can be modified in various ways.

LIST OF REFERENCE SIGNS

1 Rotor hub arrangement
2 Hub cup 3, 3' Air escape guides
4 Feedback cup
5 Air passage openings
6, 6' Air outlets
7 Shoulder
8, 8' Ribs
9 Base of the hub cup
10 Depression
11 Clearance in the circumferential wall of the hub cup
12 Circumferential wall
13 Recess
14 Direction of rotation
15 Elevation
16 Depression
17 Base of the feedback cup
18 Attachment points
19 Underpressure side
20 Pressure side
21 Cavities, slots in the feedback cup
22 Cavities, slots in the feedback cup
23 Cavities, clearances in the feedback cup
24 Spokes
25 Cavities in the hub cup
30 Fan
31 Electric motor
32 Inlet opening, inlet slit
33 Base holder
34 Axis of rotation
35 Cool airflow
36 Cool airflow
37 Fin on the base holder
R Radial direction
U Circumferential direction

The invention claimed is:

1. A rotor hub arrangement for an electric fan, comprising a hub cup which rotates during operation and comprises air escape guides on the inside thereof which are arranged and shaped in such a way that they guide and accelerate cool air, wherein a feedback cup is arranged inside the hub cup and comprises air passage openings which, together with the air escape guides, form continuous air outlets for a cool airflow from the pressure side to the underpressure side of the fan, wherein the air escape guides comprise ribs extending between the base of the hub cup and the feedback cup and the ribs extend in an arc shape in the radial and circumferential direction.

2. The arrangement of claim 1, wherein the air passage openings and air escape guides are formed in such a way that at least some of the cool air is released in the radial direction.

3. The arrangement of claim 1, wherein the air escape guides are formed in the manner of an impeller.

4. The arrangement of claim 1, wherein the ribs extend in the radial direction.

5. The arrangement of claim 1, wherein the feedback cup is made of a metal material or wherein the hub cup is made of a non-metal material.

6. The arrangement of claim 1, wherein the feedback cup is coupled to the hub cup for conjoint rotation in a predetermined position relative to the hub cup.

7. The arrangement of claim 1, wherein the feedback cup comprises a base which has a circumferential shoulder orientated towards the hub cup, the air passage openings being arranged in the region of the shoulder or extending radially outwards from the shoulder.

8. The arrangement of claim 1, wherein each air outlet comprises a recess which forms a blade face of the air escape guide extending towards circumferential wall of the hub cup.

9. The arrangement of claim 1, wherein the air outlet is formed having an axial elevation, orientated circumferentially in the direction of rotation with respect to the air outlet, and an axial depression orientated circumferentially counter to the direction of rotation with respect to the air outlet.

10. The arrangement of claim 1, wherein the feedback cup comprises a plurality of different types and sizes of cavities which enlarge radially at a constant opening angle or clearances for forming spokes.

11. The arrangement of claim 1, wherein cavities are formed in the centre of the base of the feedback cup as axial air passage openings, and cavities are provided in the centre of the base of the hub cup and are formed as axial air escape guides and which, together with the axial air passage openings, form continuous axial air outlets for releasing cool air in the axial direction.

12. An electric fan comprising an electric motor, having a pressure side and an underpressure side, wherein the fan comprises a rotor hub arrangement for an electric fan, comprising a hub cup which rotates during operation and comprises air escape guides on the inside thereof which are arranged and shaped in such a way that they guide and accelerate cool air, wherein a feedback cup is arranged inside the hub cup and comprises air passage openings which, together with the air escape guides, form continuous air outlets for a cool airflow from the pressure side to the underpressure side of the fan and wherein the fans is formed and configured so as to convey air from the underpressure side to the pressure side.

13. The fan of claim 12, wherein an inlet opening is provided on the pressure side for the cool airflow from the pressure side to the underpressure side.

14. A rotor hub arrangement for an electric fan, comprising a hub cup which rotates during operation and comprises air escape guides on the inside thereof which are arranged and shaped in such a way that they guide and accelerate cool air, wherein a feedback cup is arranged inside the hub cup and comprises air passage openings which, together with the air escape guides, form continuous air outlets for a cool airflow from the pressure side to the underpressure side of the fan, wherein the air escape guides each form a substantially radially orientated air outlet in the hub cup and the air outlet is formed countersunk in a depression in a base of the hub cup or is formed in a clearance in the circumferential wall of the hub cup.

* * * * *